US011122643B2

(12) United States Patent
Zhu et al.

(10) Patent No.: US 11,122,643 B2
(45) Date of Patent: Sep. 14, 2021

(54) LWIP ENHANCEMENTS FOR RELIABLE DRB SWITCHING

(71) Applicant: Apple Inc., Cupertino, CA (US)

(72) Inventors: Jing Zhu, Portland, OR (US); Nana Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 16/086,141

(22) PCT Filed: Aug. 30, 2016

(86) PCT No.: PCT/US2016/049437
§ 371 (c)(1),
(2) Date: Sep. 18, 2018

(87) PCT Pub. No.: WO2017/189032
PCT Pub. Date: Nov. 2, 2017

(65) Prior Publication Data
US 2020/0305218 A1 Sep. 24, 2020

Related U.S. Application Data

(63) Continuation of application No. PCT/CN2016/080368, filed on Apr. 27, 2016.

(51) Int. Cl.
H04W 76/22 (2018.01)
H04L 1/16 (2006.01)
(Continued)

(52) U.S. Cl.
CPC .......... H04W 76/22 (2018.02); H04L 1/1614 (2013.01); H04L 1/1671 (2013.01);
(Continued)

(58) Field of Classification Search
CPC ..... H04L 1/1874; H04L 1/1816; H04W 76/22
See application file for complete search history.

(56) References Cited

U.S. PATENT DOCUMENTS

2015/0139192 A1* 5/2015 Zhang ............... H04W 36/0011
370/331
2015/0146687 A1* 5/2015 Kim ..................... H04W 76/14
370/331
(Continued)

FOREIGN PATENT DOCUMENTS

WO WO-2017189032 A1 11/2017

OTHER PUBLICATIONS

"International Application Serial No. PCT/US2016/049437, International Search Report dated Jan. 25, 2017", 3 pgs.
(Continued)

Primary Examiner — Fahmida S Chowdhury
(74) Attorney, Agent, or Firm — Kowert, Hood, Munyon, Rankin & Goetzel, P.C.

(57) ABSTRACT

Embodiments of LWTP (long term evolution (LTE)/wireless local area network (WLAN) radio level integration Protocol) enhancements for reliable data radio bearer (DRB) switching are disclosed. A user equipment (UE) decodes a radio resource control (RRC) connection reconfiguration message, received from an evolved NodeB (eNB), the RRC connection reconfiguration message indicting switching DRBs from a first wireless transmission mode to second wireless transmission mode, and the RRC connection reconfiguration message including an uplink (UL) status report indicating a first missing UL sequence number, the UL status report being a UL LWIP status report. The UE causes reconfiguration of the UE according to the RRC connection reconfiguration message. The UE encodes, for transmission to the eNB, a RRC connection reconfiguration complete message. The UE encodes, for retransmission over the second wireless transmission mode, lost service data unit(s) (SDU) based on the UL status report.

20 Claims, 11 Drawing Sheets

(51) Int. Cl.
*H04L 1/18* (2006.01)
*H04W 28/04* (2009.01)

(52) U.S. Cl.
CPC .......... *H04L 1/1816* (2013.01); *H04L 1/1874* (2013.01); *H04W 28/04* (2013.01)

(56) References Cited

U.S. PATENT DOCUMENTS

| | | | |
|---|---|---|---|
| 2015/0350988 A1 | 12/2015 | Himayat et al. | |
| 2016/0191380 A1* | 6/2016 | De | H04W 40/02 370/338 |
| 2016/0234726 A1* | 8/2016 | Nuggehalli | H04W 36/0022 |
| 2016/0302077 A1* | 10/2016 | Yi | H04W 72/1215 |
| 2018/0262465 A1* | 9/2018 | Maattanen | H04W 12/068 |
| 2018/0324644 A1* | 11/2018 | Koskinen | H04W 28/0278 |

OTHER PUBLICATIONS

"International Application Serial No. PCT/US2016/049437, Written Opinion dated Jan. 25, 2017", 5 pgs.
"Stage-2 text for LWIP Tunnel Clarifications", R2-161991,3GPP TSG-RAN WG2 Meeting #93, Nokia Networks, (Feb. 19, 2016).
Burbidge, Richard, "LTE-WLAN Aggregation (LWA) and LTE WLAN Radio Level Integration with IPsec Tunnel (LWIP)", [Online] retrieved from the internet: <(http://www.slideshare.net/allabout4g/lwa-and-lwip)>, (Apr. 1, 2016).
Hsieh, Jing-Rong, "LTE-WLAN Aggregation (LWA), RAN Controlled LTE-WLAN Interworking (RCLWI), and LTE/WLAN Radio Level Integration with IPsec Tunnel (LWIP) in 3GPP Release 13", [Online] retrieved from the internet: <(http://std-share.itri.org.tw/Content/Files/Event/Files/LWA%20for%20ITRI.pdf)>, (Mar. 16, 2016).
Nokia Networks, et al., "Mobility Set Handling for LWIP", R2-161761, 3GPP TSG-RAN WG2 Meeting #93, (Feb. 12, 2016).

\* cited by examiner

LWIP ENHANCEMENTS FOR RELIABLE DRB SWITCHING

PRIORITY CLAIM

This application is a U.S. National Stage Application under 35 U.S.C. 371 from International Application No. PCT/US2016/049437, filed Aug. 30, 2016 and published as WO 2017/189032 A1 on 2 Nov. 2017, which claims priority under 35 U.S.C. § 119 to Patent Cooperation Treaty (PCT) International Application No. PCT/CN2016/080368, filed Apr. 27, 2016, and titled, "SWITCHING FROM THE LTE LINK TO AN LWIP TUNNEL," all of which are [is] incorporated herein by reference in their [its] entirety.

TECHNICAL FIELD

Embodiments pertain to wireless communications. Some embodiments relate to radio access network (RAN) layers 2 and 3. Some embodiments relate to long term evolution (LTE)/wireless local area network (WLAN) radio level Integration Protocol (LWIP) enhancements for reliable data radio bearer (DRB) switching between LTE and Wi-Fi.

BACKGROUND

In a cellular network, a user equipment (UE) may sometimes switch from accessing data over a long term evolution (LTE) network to accessing data over a Wi-Fi network, and vice versa, for example, in response to the UE being moved into or out of a Wi-Fi coverage area. Seamlessly switching from one wireless transmission mode (e.g., LTE or Wi-Fi) to another may be desirable.

Thus, there are general needs for systems and methods for LTE/wireless local area network (WLAN) radio level integration Protocol (LWIP) enhancements for reliable data radio bearer (DRB) switching between LTE and Wi-Fi.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
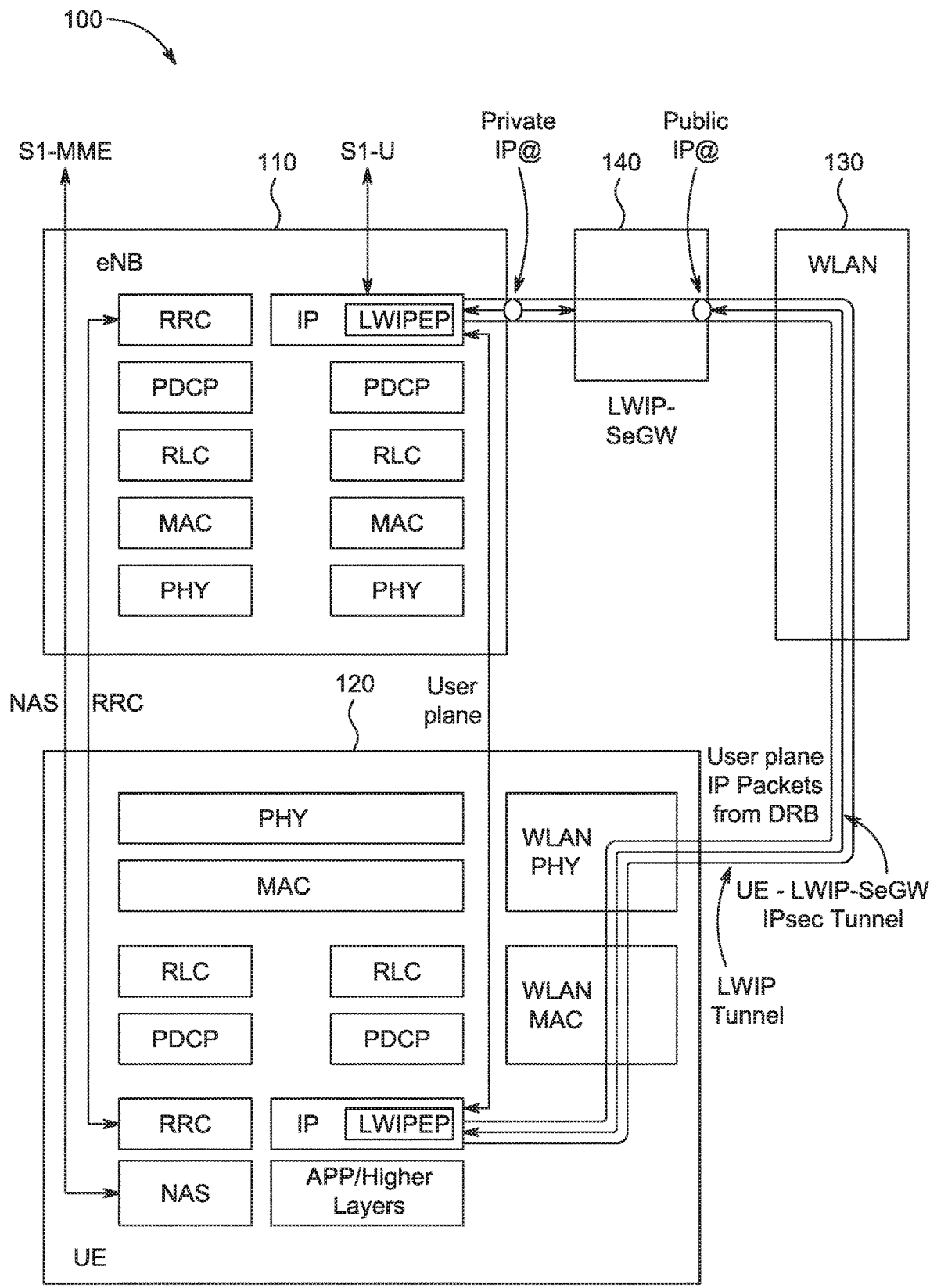
FIG. 1 is a block diagram of an example long term evolution (LTE)/wireless local area network (WLAN) radio level integration system, in accordance with some embodiments.

FIG. 1 is a block diagram of an example long term evolution (LTE)/wireless local area network (WLAN) radio level Integration Protocol (LWIP) system 100, in accordance with some embodiments. As shown, the system 100 includes an evolved NodeB (eNB) 110, a user equipment (UE) 120, a WLAN 130, and a LWIP secure gateway (LWIP-SeGW) 140. The eNB 110 communicates with the UE 120 over LTE, and the WLAN 130 communicates with the UE 120 over Wi-Fi. The LWIP-SeGW 140 communicates with the eNB 110 and the WLAN 130.

The eNB 110 includes the following layers: Internet Protocol (IP), radio resource control (RRC), packet data convergence protocol (PDCP), radio link control (RLC), medium access control (MAC), and physical (PHY). The IP layer includes LWIP encapsulation protocol (LWIPEP).

The UE includes the following layers: PHY, MAC, RLC, PDCP, RRC, non-access stratum (NAS), IP, application (APP)/higher layers, WLAN PHY, and WLAN MAC. The IP layer includes LWIPEP.

As shown, the LWIPEP at the UE 120 communicates with the LWIP-SeGW 140 and the LWIPEP at the eNB 110 using a LWIP tunnel. The LWIP tunnel includes the private IP of the eNB 110 and the public IP of the LWIP-SeGW 140. The LWIP tunnel includes a UE-LWIP-SeGW IPsec tunnel. The LWIP tunnel is used to transmit user plane IP packets from data radio bearer (DRB).

FIG. 1 shows an example protocol architecture for LWIP. The eNB 110 is the mobility anchor, and WLAN link aggregation is transparent to Third Generation Partnership Project (3GPP) core network elements (e.g., mobility management entity (MME), secure gateway (S-GW), and packet gateway (P-GW)). The UE 120 establishes the LWIP tunnel with the eNB 110 via WLAN 130 through LWIP-SeGW 140, and IPSec may be used to protect the UE's 120 IP traffic over the LWIP tunnel, which is transparent to WLAN 130, and requires no changes to the existing WLAN 130 deployment. Furthermore, traffic steering and multi-radio access technology (RAT) radio resource management (RRM) takes place over the top of the LTE radio access network (RAN) u-plane protocol stack (above PDCP).

It may be desirable to ensure in-order and reliable delivery when switching the UE's 120 DRB from the LTE link to the LWIP tunnel, and vice versa. Some aspects of the subject technology are directed to addressing this issue.

Some aspects of the subject technology are directed to enhancing the LWIPEP data PDU format to carry the LWIP sequence number either in the generic routing encapsulation (GRE) header on the LWIP trailer. According to some aspects, when switching a DRB from the LWIP (over Wi-Fi) tunnel back to the LTE link, the receiver feedbacks the First Missing LWIPEP sequence number (SN) and bitmap of received LWIPEP service data units (SDUs), so that the transmitter may retransmit those lost SDUs over the LTE link before starting sending the new ones. According to some aspects, when switching a DRB from the LTE link to the LWIP tunnel, the transmitter sends a special "End Marker" packet over the LTE link. In the meantime, the receiver buffers the received LWIPEP SDUs from the LWIP tunnel until the "End Marker" arrives from the LTE link, to ensure in-order packet delivery after the switching.

Some implementations include LWIPEP enhancements for sequence number. The LWIPEP protocol is enhanced such that the transmitter (UE for uplink (UL) or eNB for downlink (DL)) sets the sequence number field of the GRE header or the LWIP trailer to the LWIP sequence number. The LWIP sequence number is counted on a per DRB basis.

PDCP and LWIPEP are enhanced for the "end marker" described above. According to one approach, one of the reserved bits in the PDCP data PDU header is defined to indicate the PDCP data PDU is the "end marker." According to another approach, a PDCP data PDU with an empty payload is defined as the "end marker." "End marker" support may be implemented in LWIPEP by adding a new field in the LWIPEP header or trailer to indicate whether a LWIPEP data PDU is the "end marker."

Figure 2:
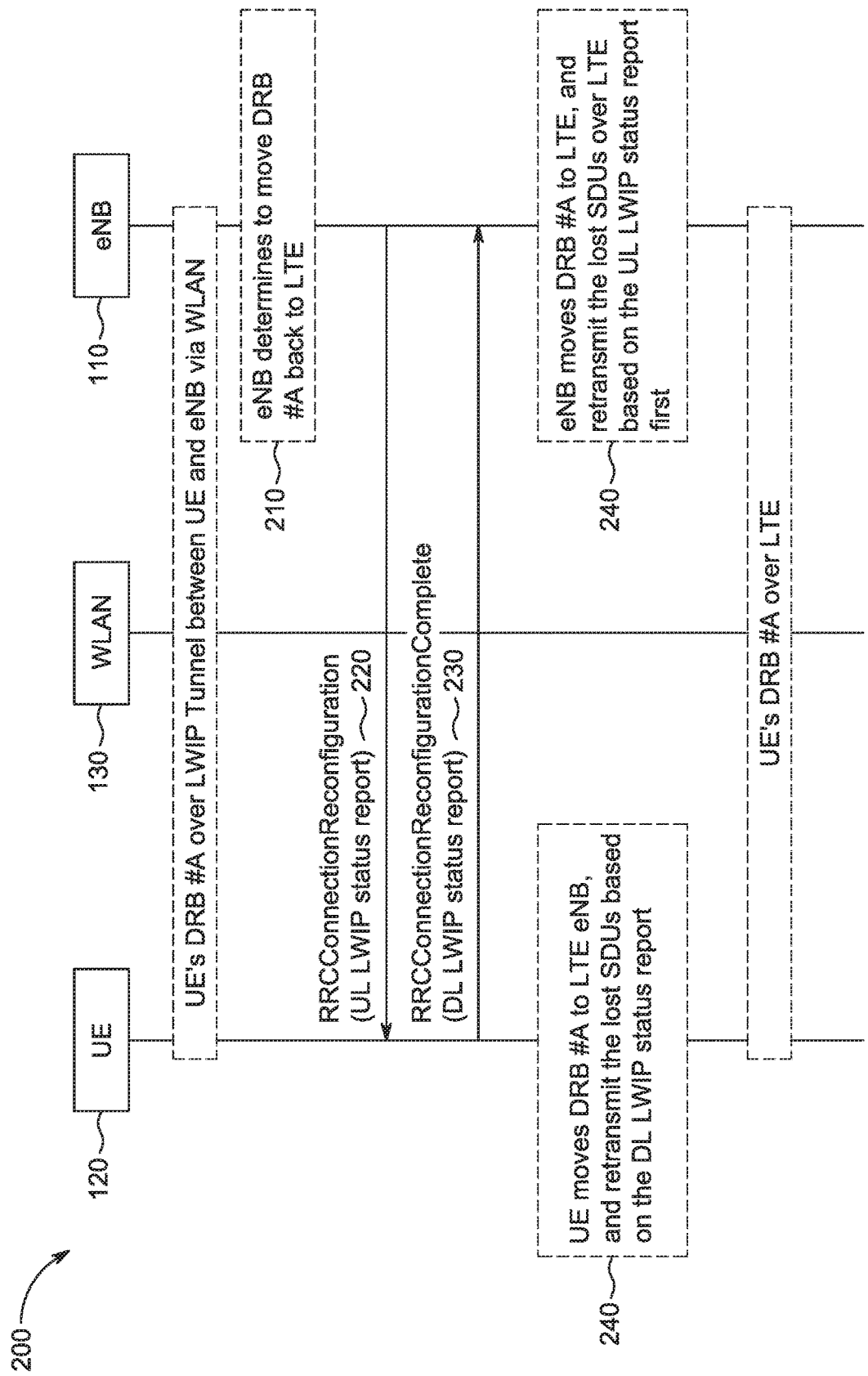
FIG. 2 is a flow chart of an example LWIP-to-LTE data radio bearer (DRB) switching method, in accordance with some embodiments.

Some examples of the subject technology relate to an enhanced LWIP- to LTE-switching technique. One issue for switching from LWIP to LTE is how to identify the SDUs that are lost over the Wi-Fi link. FIG. 2, discussed below, shows one proposed method with the following key steps. According to some aspects of the subject technology, the receiver (UE for DL, eNB for UL) feedbacks the "DL (or UL) LWIP Status Report", including the First Missing (LWIPEP) SN and, in some cases, the bitmap of received LWIPEP SDUs. As a result, the transmitter (UE for UL, eNB for DL) knows which LWIPEP SDUs are lost and need to be retransmitted.

FIG. 2 is a flow chart of an example LWIP-to-LTE DRB switching method 200, in accordance with some embodiments. Prior to implementation of the method 200, the UE's 120 DRB #A (where A is an integer greater than or equal to zero) passes over the LWIP tunnel between the UE 120 and the eNB 110 via WLAN 130.

At operation 210, the eNB 110 determines to move the UE's 120 DRBs back to LTE.

At operation 220, the eNB 110 sends the RRC connection reconfiguration message to the UE 120. The RRC connection reconfiguration message includes the indication to switch DRBs. The RRC connection reconfiguration message also includes the "UL LWIP Status Report" if any of UE's 120 UL DRBs is moved from LWIP to LTE. The "UL LWIP status report" indicates the first missing LWIP Sequence Number, and, in some cases, includes a bitmap of the received LWIPEP SDUs for the UL.

At operation 230, the UE 120 applies the new configuration and replies with RRC Connection Reconfiguration Complete message. The UE 120 also include the "DL LWIP Status Report" if any of UE's DL DRBs is moved from LWIP to LTE. The "DL LWIP status report" indicates the first missing LWIP Sequence Number, and, in some cases, includes a bitmap of the received LWIPEP SDUs for the DL.

At operation 240, the UE 120 (or the eNB 110) retransmits the lost SDUs over the LTE links based on "UL (or DL) LWIP Status Report", and then moves the UL (DL) DRBs to the LTE links.

To support the proposed LWIP-to-LTE switching procedure, the transmitter needs to buffer the LWIPEP SDUs that are sent to the LWIP tunnel. Some aspects of the subject technology include a new configuration parameter—LWIPEP Buffering Timer, which can be either pre-defined in the 3GPP standard or included by the eNB in its RRC message to activate or configure LWIP. The LWIPEP Buffering Timer indicates how long a LWIPEP SDU is held by the transmitter after it is sent to the LWIP tunnel.

Figure 3:
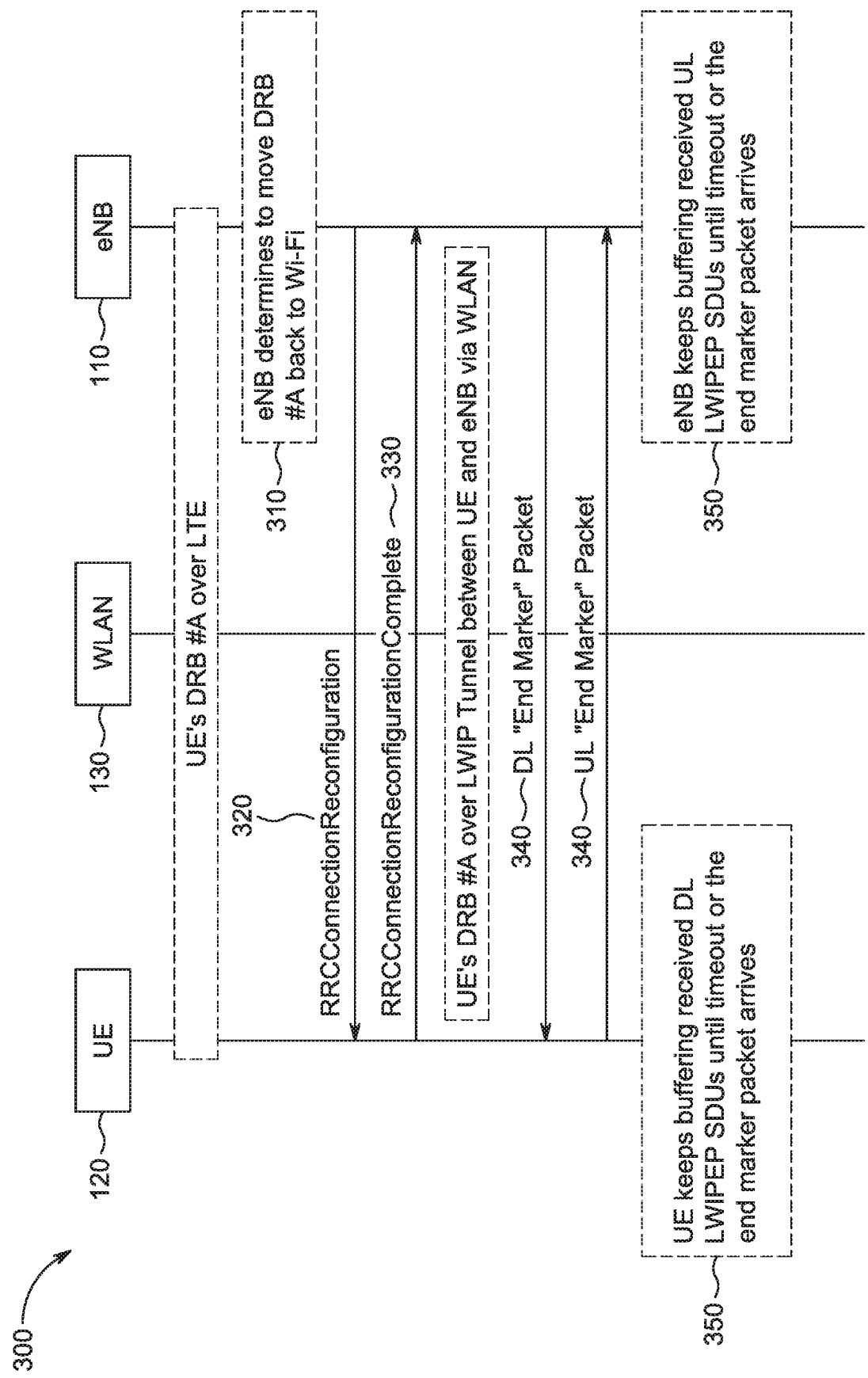
FIG. 3 is a flow chart of an example LTE-to-LWIP data radio bearer (DRB) switching method, in accordance with some embodiments.

Aspects of the subject technology are directed to an enhanced LTE-to-LWIP DRB switching procedure. One issue for switching from LTE to LWIP is how to ensure packets are delivered in order because some SDUs might still being delivered over the LTE link. FIG. 3, discussed below, shows the proposed procedure with the following key steps. Here, aspects of the subject technology include having the transmitter (UE for UL, eNB for DL) send "End-Marker" packets over the LTE link so that receiver knows which SDU is the last one on the LTE link.

FIG. 3 is a flow chart of an example LTE-to-LWIP data radio bearer (DRB) switching method 300, in accordance with some embodiments. Prior to implementation of the method 300, the UE's 120 DRB #A (where A is an integer greater than or equal to zero) is transmitted over LTE.

At operation 310, the eNB 110 determines that it needs to move UE's 120 DRBs to LWIP (Wi-Fi).

At operation 320, The eNB 110 sends the RRC Connection Reconfiguration message to the UE 120. The RRC Connection Reconfiguration message includes the indication to switch DRBs.

At operation 330, the UE 120 applies the new configuration and replies with the RRC Connection Reconfiguration Complete message. The UE 120 starts the "wait-for-DL-end-marker" timer if any of its DL DRBs is moved to LWIP, and the eNB 110 starts the "wait-for-UL-end-marker" if any of the UE's 120 UL DRBs is moved to LWIP. After operation 330, the UE's DRB #A is transmitted over the LWIP tunnel between the UE 120 and the eNB 110 via WLAN 130.

At operation 340, the UE 120 (or eNB 110) moves the corresponding UL (or DL) DRBs to LWIP, and sends the "End Marker" for the UL (or DL) DRBs that are moved to LWIP.

At operation 350, the eNB 110 (or UE 120) buffers the received LWIPEP PDUs until either the "End Marker" arrives or the "wait-for-DL(UL)-end-marker" timer expires.

To support the proposed LTE-to-LWIP switching procedure, the receiver buffers the LWIPEP SDUs that are sent to the LWIP tunnel until the "End Marker" packet arrives. Some aspects of the subject technology include the configuration parameter—LWIPEP Wait-for-DL(UL)-End-Marker Timer, which can be either pre-defined in the 3GPP standard or included by the eNB 110 in its RRC message to activate or configure LWIP. The LWIPEP Wait-for-DL(UL)-End-Marker Timer indicates how long a LWIPEP SDU is held by the receiver until the "End Marker" packet arrives when switching a DRB from LTE to LWIP.

Figure 4:
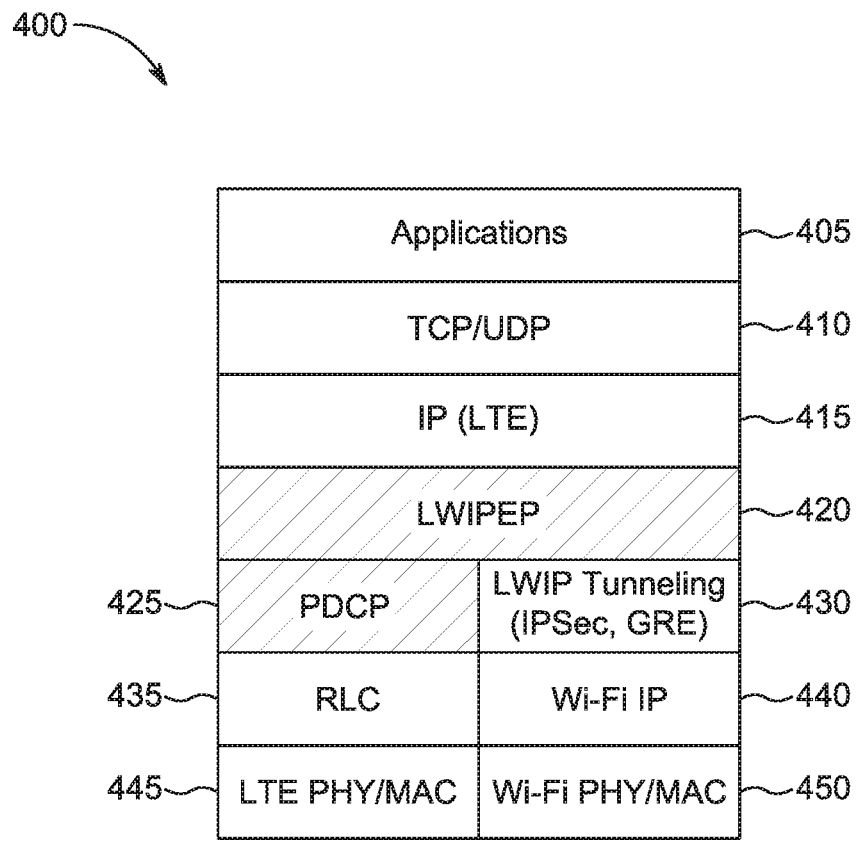
FIG. 4 is a block diagram of an example LTE/LWIP bearer splitting u-plane protocol stack, in accordance with some embodiments.

FIG. 4 is a block diagram of an example LTE/LWIP bearer splitting u-plane protocol stack 400, in accordance with some embodiments. As shown, the LTE/LWIP bearer splitting u-plane protocol stack 400 includes an application layer 405, a transmission control protocol (TCP)/user datagram protocol (UDP) layer 410, an IP (LTE) layer 415, and a LWIPEP layer 420. Below the LWIPEP layer 420 are the PDCP layer 425, the RLC layer 435, and the LTE PHY/MAC layer 445, in that order from top to bottom, for LTE. Below the LWIPEP layer 420 are the LTE tunneling (IPsec, GRE) layer 430, the Wi-Fi IP layer 440, and the Wi-Fi PHY/MAC layer 450, in that order from top to bottom, for Wi-Fi.

Figure 5:
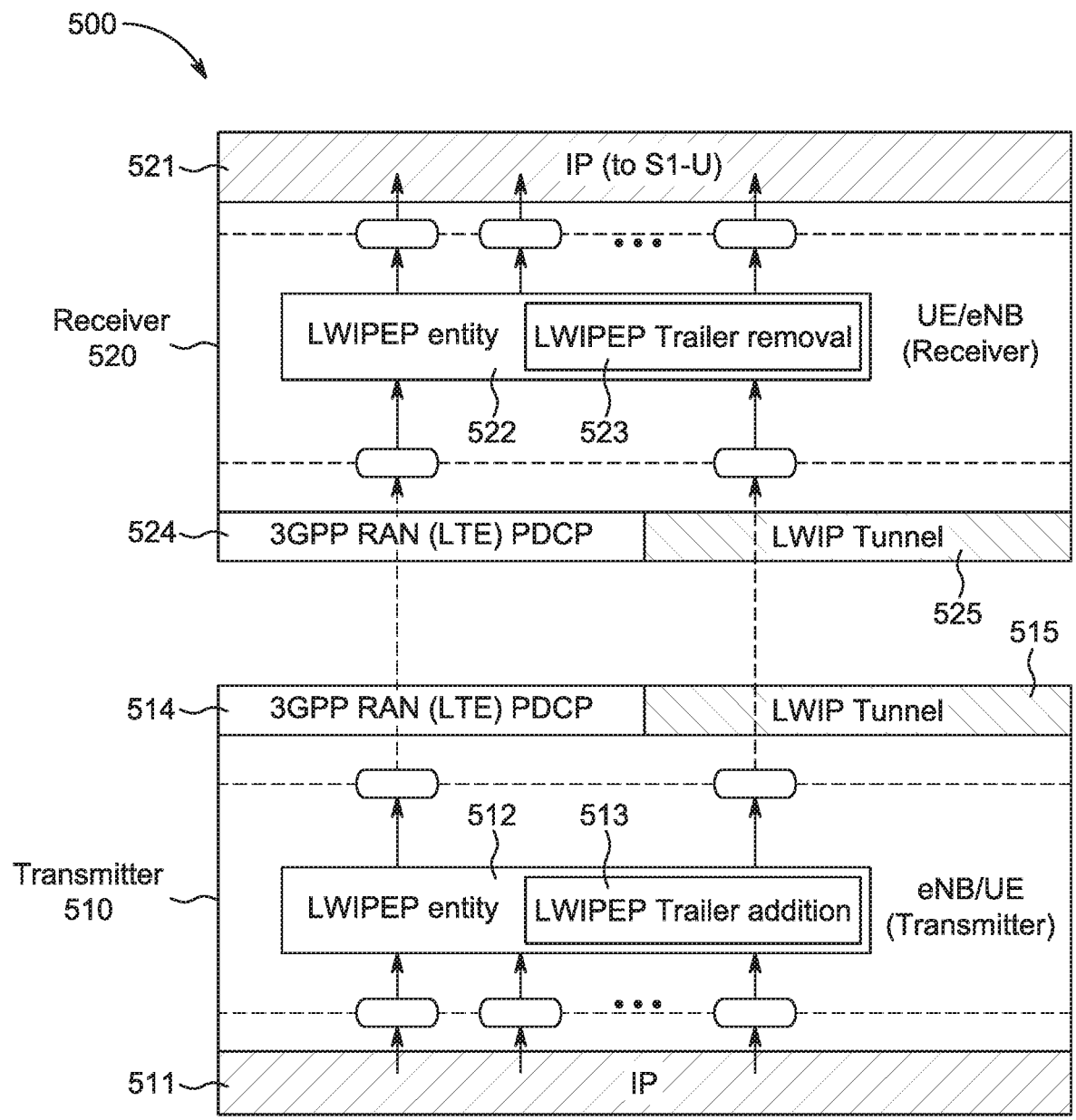
FIG. 5 is a block diagram of an example enhanced LWIP encapsulation protocol (LWIPEP) sublayer model for bearer splitting, in accordance with some embodiments.

The embodiment shown in FIG. 4 includes, among other things, two enhancements. LWIPEP 420 is enhanced to support bearer splitting, aggregation, and reordering functions, and to operate on the top of both LWIP tunneling layer 430 (via the Wi-Fi link) and the 3GPP RAN u-plane protocol—PDCP layer 425 (via the LTE link). FIG. 5, discussed in more detail below, shows the enhanced LWIPEP sublayer model.

In some examples, the PDCP data PDU format is enhanced to carry LWIPIP PDU (as discussed in more detail below in conjunction with FIG. 6). In some cases, the LWIPEP PDU is an IP data packet with an LWIP trailer. Therefore, all the existing PDCP functions (e.g., IP header compression and the like) remain the same. According to one embodiment, one of the reserved bits in the PDCP header is used to indicate if the PDCP payload is LWIPEP PDU or not. According to one embodiment, a new DRB is established to deliver LWIPEP PDU when LWIP is enabled over the LTE link for bearer splitting. The LWIP trailer may include only the LWIP sequence number and not the DRB ID or the IP checksum, to minimize overhead if a LWIPEP PDU is delivered over LTE.

FIG. 5 is a block diagram of an example enhanced LWIPEP sublayer model 500 for bearer splitting, in accordance with some embodiments. As shown, the model 500 includes a transmitter (eNB or UE) 510 and a receiver (eNB or UE) 520. In the transmitter 510, data is passed from the IP layer 511 to the LWIPEP entity 512, where LWIPEP trailer addition 513 takes place. Data is then passed to the receiver 520 via 3GPP RAN (LTE) PDCP 514 of the transmitter 510 and 3GPP RAN (LTE) PDCP 524 of the receiver 520 or, alternatively, via the LWIP tunnel 515 of the transmitter 510 and via the LWIP tunnel 525 of the receiver 520. At the receiver 520, the data is passed to the LWIPEP entity 522, where LWIPEP trailer removal 523 takes place. The data is then passed to the IP layer 521 of the receiver 520.

Figure 6:
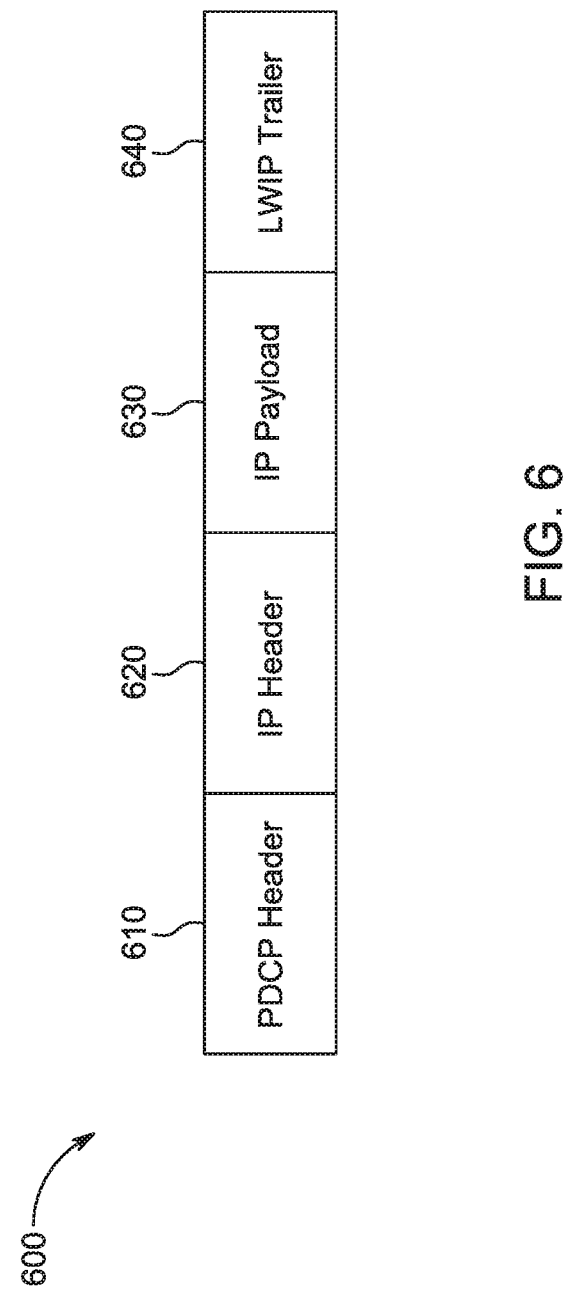
FIG. 6 is a block diagram of an example enhanced packet data convergence protocol (PDCP) data packet data unit (PDU) format, in accordance with some embodiments.

FIG. 6 is a block diagram of an example enhanced PDCP PDU format 600, in accordance with some embodiments. As shown the PDCP PDU format 600 includes a PDCP header 610, an IP header 620, an IP payload 630, and a LWIP trailer 640. The LWIP trailer 640 may be added at block 513 of FIG. 5 and removed at block 523 of FIG. 5.

It should be noted that the subject technology may be extended. The solutions proposed herein can be used to support above PDCP (below IP) 5G multi-RAT integration with any tunneling protocol, such as UDP, Ethernet, and the like.

Figure 7:
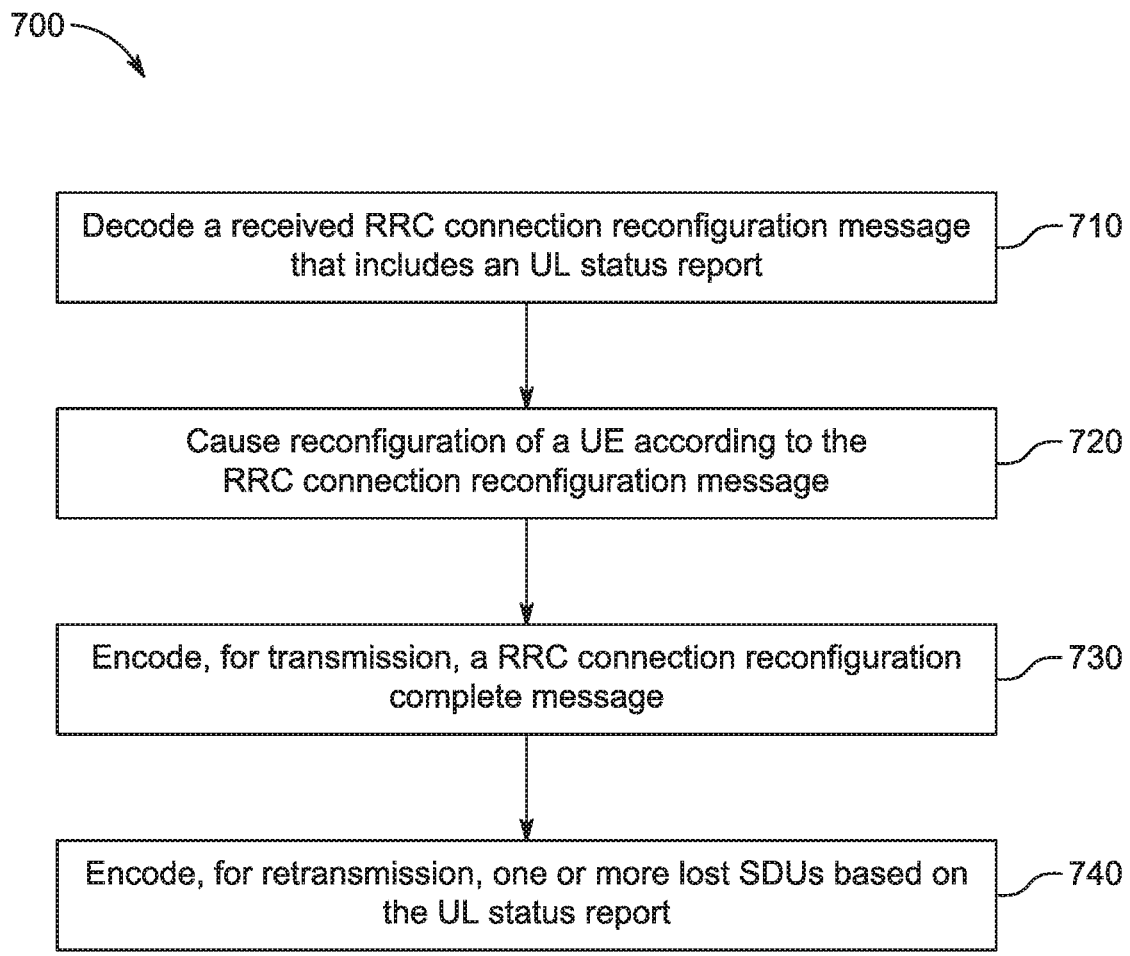
FIG. 7 is a flow chart of an example method for causing reconfiguration of a user equipment (UE) according to a radio resource control (RRC) connection reconfiguration message, in accordance with some embodiments.

FIG. 7 is a flow chart of an example method 700 for causing reconfiguration of a user equipment (UE) according to a radio resource control (RRC) connection reconfiguration message, in accordance with some embodiments.

The method 700 begins at operation 710, where the UE decodes a received RRC connection reconfiguration message that includes an UL status report.

At operation 720, the UE causes reconfiguration of the UE (e.g., reconfigures itself) according to the RRC connection reconfiguration message.

At operation 730, the UE encodes, for transmission, a RRC connection reconfiguration complete message.

At operation 740, the UE encodes, for retransmission, one or more lost SDUs based on the UL status report. The method 700 is described in more detail in conjunction with the examples below.

Figure 8:
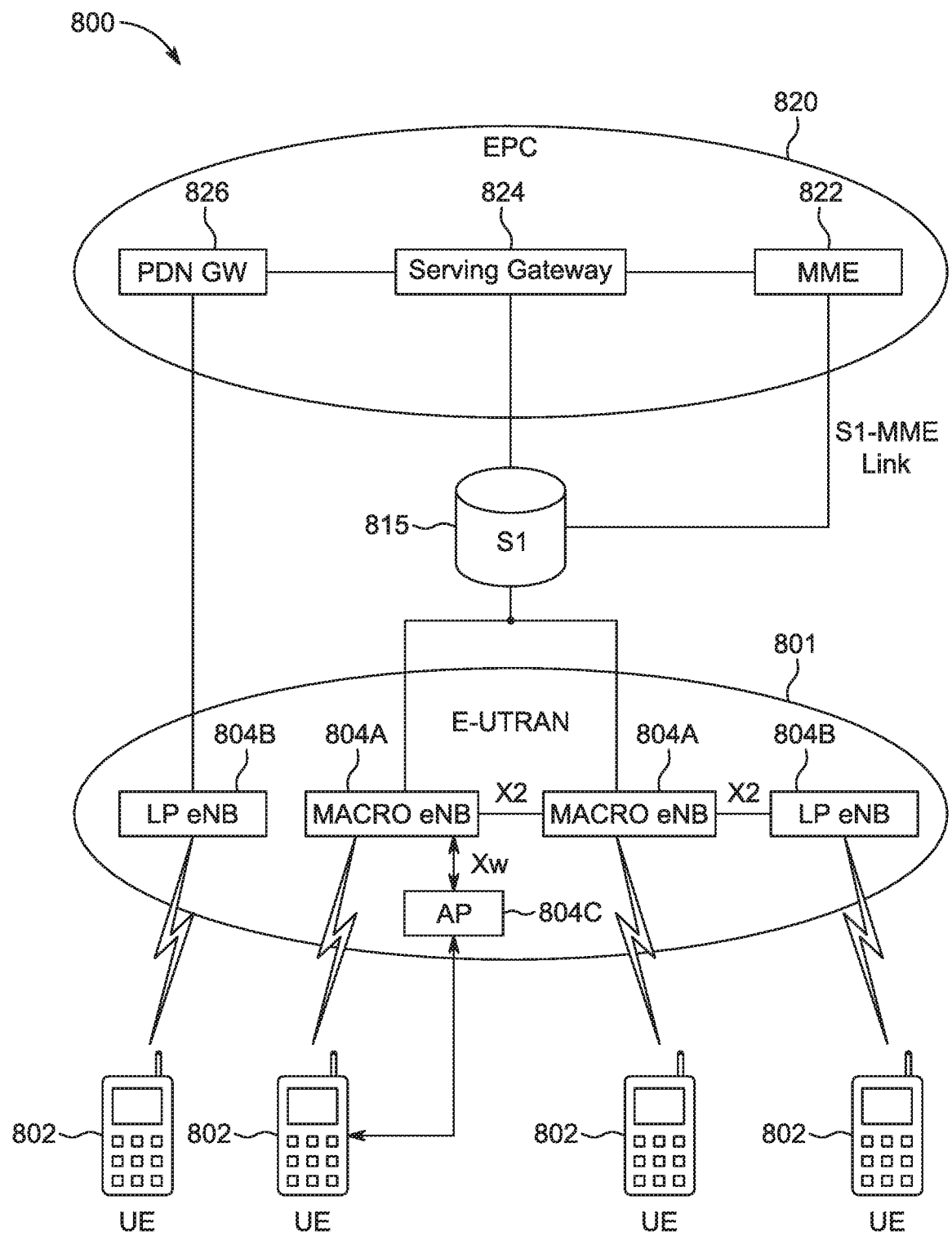
FIG. 8 is a functional diagram of a wireless network, in accordance with some embodiments.

FIG. 8 shows an example of a portion of an end-to-end network architecture of a Long Term Evolution (LTE) network 800 with various components of the network in accordance with some embodiments. As used herein, an LTE network refers to both LTE and LTE Advanced (LTE-A) networks as well as other versions of LTE networks to be developed. The network 800 may comprise a radio access network (RAN) (e.g., as depicted, the E-UTRAN or evolved universal terrestrial radio access network) 801 and core network 820 (e.g., shown as an evolved packet core (EPC)) coupled together through an S1 interface 815. For convenience and brevity, only a portion of the core network 820, as well as the RAN 801, is shown in the example. The network 800 includes the UE 802, which is configured to select an eNB Tx beam in a 5G eNB based on BRS measurements; transmit a PRACH or SR on a dedicated resource allocated by a LTE eNB; transmit a report indicating the selected eNB Tx beam in the 5G eNB via a PUSCH or PUCCH in the LTE eNB; receive a PDCCH order from the LTE eNB or a xPDCCH order from the 5G eNB for triggering a xPRACH transmission in the 5G eNB; and transmit xPRACH on a resource indicated in the received PDCCH or xPDCCH order in the 5G eNB.

The core network 820 may include a mobility management entity (MME) 822, serving gateway (serving GW) 824, and packet data network gateway (PDN GW) 826. The RAN 801 may include evolved node Bs (eNBs) 804 (which may operate as base stations) for communicating with user equipment (UE) 802. The eNBs 804 may include macro eNBs 804a and low power (LP) eNBs 804b. The UEs 802 may correspond to the UE 120, the transmitter 510 or the receiver 520. The eNBs 804 may correspond to the eNB 110, the transmitter 510 or the receiver 520.

The MME 822 may be similar in function to the control plane of legacy Serving GPRS Support Nodes (SGSN). The MME 822 may manage mobility aspects in access such as gateway selection and tracking area list management. The serving GW 824 may terminate the interface toward the RAN 801, and route data packets between the RAN 801 and the core network 820. In addition, the serving GW 824 may be a local mobility anchor point for inter-eNB handovers and also may provide an anchor for inter-3GPP mobility. Other responsibilities may include lawful intercept, charging, and some policy enforcement. The serving GW 824 and the MME 822 may be implemented in one physical node or separate physical nodes.

The PDN GW 826 may terminate a SGi interface toward the packet data network (PDN). The PDN GW 826 may route data packets between the EPC 820 and the external PDN, and may perform policy enforcement and charging data collection. The PDN GW 826 may also provide an anchor point for mobility devices with non-LTE access. The external PDN can be any kind of IP network, as well as an IP Multimedia Subsystem (IMS) domain. The PDN GW 826 and the serving GW 824 may be implemented in a single physical node or separate physical nodes.

The eNBs 804 (macro and micro) may terminate the air interface protocol and may be the first point of contact for a UE 802. In some embodiments, an eNB 804 may fulfill various logical functions for the RAN 801 including, but not limited to, RNC (radio network controller functions) such as radio bearer management, uplink and downlink dynamic radio resource management and data packet scheduling, and mobility management. In accordance with embodiments, UEs 802 may be configured to communicate orthogonal frequency division multiplexed (OFDM) communication signals with an eNB 804 over a multicarrier communication channel in accordance with an OFDMA communication technique. The OFDM signals may comprise a plurality of orthogonal subcarriers.

The S1 interface 815 may be the interface that separates the RAN 801 and the EPC 820. It may be split into two parts: the S1-U, which may carry traffic data between the eNBs 804 and the serving GW 824, and the S1-MME, which may be a signaling interface between the eNBs 804 and the MME 822. The X2 interface may be the interface between eNBs 804. The X2 interface may comprise two parts, the X2-C and X2-U. The X2-C may be the control plane interface between the eNBs 804, while the X2-U may be the user plane interface between the eNBs 804.

With cellular networks, LP cells 804*b* may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 804*b* might be a femtocell eNB since it is coupled through the PDN GW 826. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 804*a* via an X2 interface. Picocell eNBs or other LP eNBs LP eNB 804*b* may incorporate some or all functionality of a macro eNB LP eNB 804*a*. In some cases, this may be referred to as an access point base station or enterprise femtocell.

In some embodiments, the UE 802 may communicate with an access point (AP) 804*c*. The AP 804*c* may use only the unlicensed spectrum (e.g., WiFi bands) to communicate with the UE 802. The AP 804*c* may communicate with the macro eNB 804A (or LP eNB 804B) through an Xw interface. In some embodiments, the AP 804*c* may communicate with the UE 802 independent of communication between the UE 802 and the macro eNB 804A. In other embodiments, the AP 804*c* may be controlled by the macro eNB 804A and use LWA, as described in more detail below.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 9:
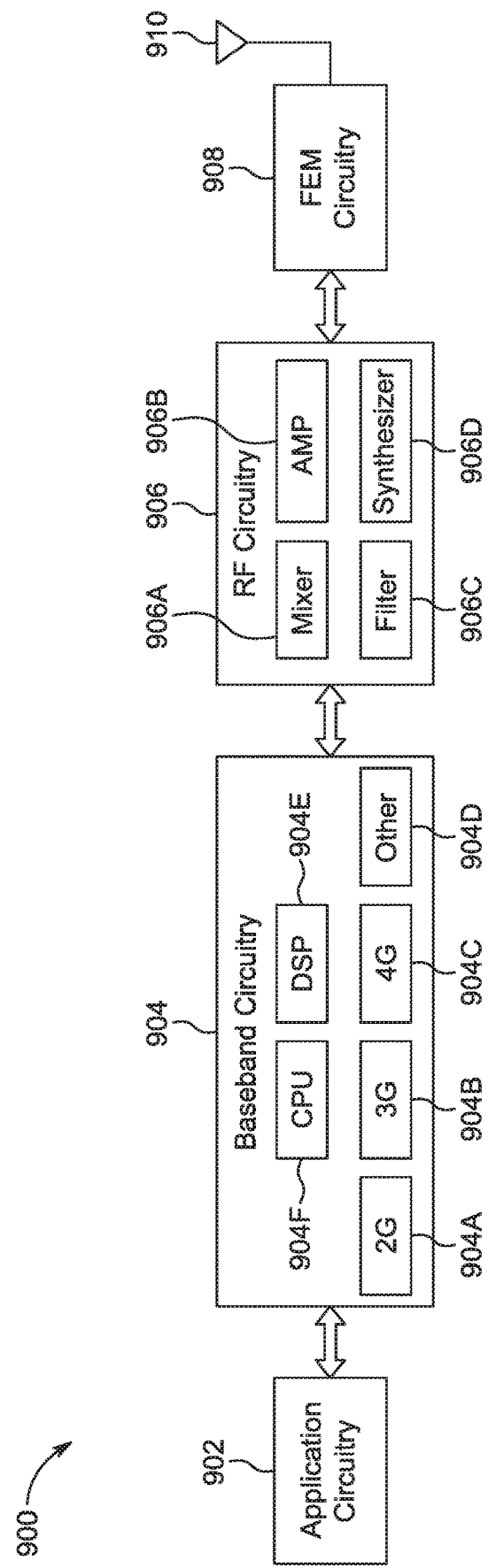
FIG. 9 illustrates components of a communication device, in accordance with some embodiments.

Embodiments described herein may be implemented into a system using any suitably configured hardware and/or software. FIG. 9 illustrates components of a UE in accordance with some embodiments. At least some of the components shown may be used in an eNB or MME, for example, such as the UE 802 or eNB 804 shown in FIG. 8. The UE 900 and other components may be configured to use the synchronization signals as described herein. The UE 900 may be one of the UEs 902 shown in FIG. 1 and may be a stationary, non-mobile device or may be a mobile device. In some embodiments, the UE 900 may include application circuitry 902, baseband circuitry 904, Radio Frequency (RF) circuitry 906, front-end module (FEM) circuitry 908 and one or more antennas 910, coupled together at least as shown. At least some of the baseband circuitry 904, RF circuitry 906, and FEM circuitry 908 may form a transceiver. In some embodiments, other network elements, such as the eNB may contain some or all of the components shown in FIG. 9. Other of the network elements, such as the MME, may contain an interface, such as the S1 interface, to communicate with the eNB over a wired connection regarding the UE.

The application or processing circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include FFT, precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry

906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 may include additional elements such as, for example, memory/storage, display, camera, sensor, and/or input/output (I/O) interface as described in more detail below. In some embodiments, the UE 900 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 900 may include one or more user interfaces designed to enable user interaction with the system and/or peripheral component interfaces designed to enable peripheral component interaction with the system. For example, the UE 900 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 910 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 910 may be effectively separated to take advantage of spatial diversity and the different channel characteristics that may result.

Although the UE 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 10:
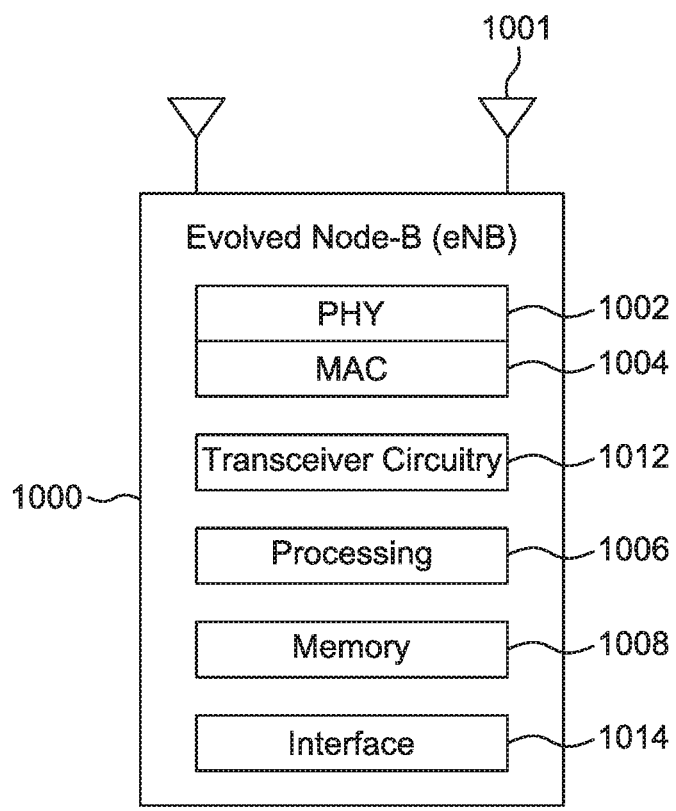
FIG. 10 illustrates a block diagram of a communication device, in accordance with some embodiments.

FIG. 10 is a block diagram of a communication device in accordance with some embodiments. The device may be a UE or eNB, for example, such as the UE 802 or eNB 804 shown in FIG. 8. The physical layer circuitry 1002 may perform various encoding and decoding functions that may include formation of baseband signals for transmission and decoding of received signals. The communication device 1000 may also include medium access control layer (MAC) circuitry 1004 for controlling access to the wireless medium. The communication device 1000 may also include processing circuitry 1006, such as one or more single-core or multi-core processors, and memory 1008 arranged to perform the operations described herein. The physical layer circuitry 1002, MAC circuitry 1004 and processing circuitry 1006 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 1000 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 1000 may include transceiver circuitry 1012 to enable communication with other external devices wirelessly and interfaces 1014 to enable wired communication with other external devices. As another example, the transceiver circuitry 1012 may perform various transmission and reception functions such as conversion of signals between a baseband range and a Radio Frequency (RF) range.

The antennas 1001 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1001 may be effectively separated to take advantage of spatial diversity and the different channel characteristics that may result.

Although the communication device 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 11:
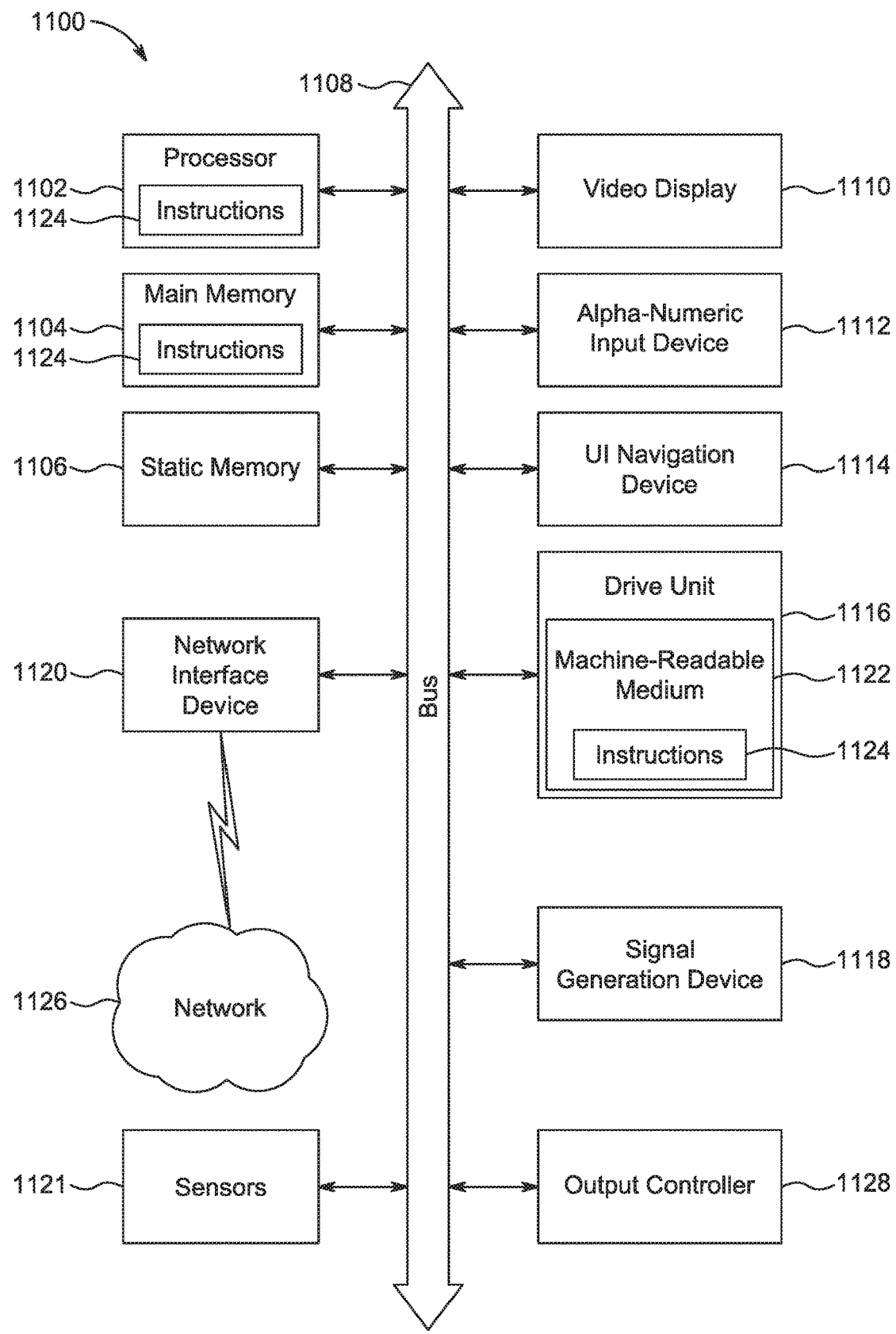
FIG. 11 illustrates another block diagram of a communication device, in accordance with some embodiments.

FIG. 11 illustrates another block diagram of a communication device 1100 in accordance with some embodiments. The communication device 1100 may correspond to the UE 802 or the eNB 804. In alternative embodiments, the communication device 1100 may operate as a standalone device or may be connected (e.g., networked) to other communication devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The communication device 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The communication device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a communication device readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the communication device 1100. In an example, one or any combination of the hardware processor 1102, the main memory 1104, the static memory 1106, or the storage device 1116 may constitute communication device readable media.

While the communication device readable medium 1122 is illustrated as a single medium, the term "communication device readable medium" may include a single medium or multiple media (e.g., a centralized or distributed database, and/or associated caches and servers) configured to store the one or more instructions 1124.

The term "communication device readable medium" may include any medium that is capable of storing, encoding, or carrying instructions for execution by the communication device 1100 and that cause the communication device 1100 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, or multiple-input single-output (MISO) techniques. In some examples, the network interface device 1120 may wirelessly communicate using Multiple User MIMO tech- The term "transmission medium" shall be taken to include any intangible medium that is capable of storing, encoding or carrying instructions for execution by the communication device 1100, and includes digital or analog communications signals or other intangible medium to facilitate communication of such software.

The subject technology is described below in conjunction with various examples.

Example 1 is an apparatus of a user equipment (UE), the apparatus comprising: processing circuitry and memory; the processing circuitry to: decode a radio resource control (RRC) connection reconfiguration message, received from an evolved NodeB (eNB), the RRC connection reconfiguration message indicting switching data radio bearers (DRBs) from a first wireless transmission mode to a second wireless transmission mode, and the RRC connection reconfiguration message including an uplink (UL) status report indicating a first missing UL sequence number, the UL status report being a UL long term evolution (LTE)/wireless local area network (WLAN) radio level Integration Protocol (LWIP) status report; reconfigure the UE to switch DRBs according to the RRC connection reconfiguration message; encode, for transmission to the eNB, a RRC connection reconfiguration complete message; encode, for retransmission over the second wireless transmission mode, one or more lost service data units (SDUs) based on the UL status report.

Example 2 is the apparatus of Example 1, wherein: the first wireless transmission mode comprises Wi-Fi, and the second wireless transmission mode comprises LTE.

Example 3 is the apparatus of any of Examples 1-2, wherein the processing circuitry is further to: encode, for transmission to the eNB together with the RRC connection reconfiguration complete message, a downlink DL status report when at least one of the UE's DRBs is to be switched from the first wireless transmission mode to the second wireless transmission mode, the DL status report indicating a first missing DL sequence number, the DL status report being a DL LWIP status report.

Example 4 is the apparatus of Example 3, wherein the DL status report includes a bitmap of encapsulation protocol (EP) SDUs for the DL received at the UE.

Example 5 is the apparatus of any of Examples 1-2, wherein the UL status report includes a bitmap of encapsulation protocol (EP) SDUs for the UL received at the eNB.

Example 6 is the apparatus of any of Examples 1-2, wherein the RRC connection reconfiguration message indicates an encapsulation protocol (EP) buffering timer for buffering SDUs that are sent via a tunnel, the EP buffering timer indicating how long a SDU is held by a transmitter after being sent to the tunnel.

Example 7 is the apparatus of any of Examples 1-2, wherein an encapsulation protocol (EP) buffering timer for buffering SDUs that are sent via a tunnel is pre-defined, the EP buffering timer indicating how long a SDU is held by a transmitter after being sent to the tunnel.

Example 8 is the apparatus of any of Examples 1-2, wherein the processing circuitry comprises a baseband processor.

Example 9 is the apparatus of any of Examples 1-2, further comprising transceiver circuitry to: receive the RRC connection reconfiguration message; and transmit the RRC connection reconfiguration complete message.

Example 10 is the apparatus of Example 9, wherein the transceiver circuitry is further to: retransmit, over the second wireless transmission mode, the one or more lost SDUs based on the UL status report.

Example 11 is the apparatus of Example 9, further comprising an antenna coupled to the transceiver circuitry.

Example 12 is an apparatus of an evolved NodeB (eNB), the apparatus comprising: processing circuitry and memory; the processing circuitry to: determine that one or more data radio bearers (DRBs) of a user equipment (UE) are to be switched from long term evolution (LTE) to Wi-Fi; encode, for transmission to the UE, a radio resource control (RRC) connection reconfiguration message, the RRC connection reconfiguration message indicting switching the data radio bearers (DRBs) from LTE to Wi-Fi; start a wait-for-uplink-end-marker timer when at least one of the uplink (UL) DRBs of the UE is switched to Wi-Fi; switch one or more downlink (DL) DRBs of the UE to Wi-Fi and encode an end marker for the switched DL DRBs; and encode for buffering of LTE/wireless local area network (WLAN) radio level Integration Protocol encapsulation protocol (LWIPEP) service data units (SDUs) until decoding a UL end marker received from the UE or until expiry of the wait-for-uplink-end-marker timer.

Example 13 is the apparatus of Example 12, wherein the RRC connection reconfiguration message is for causing the UE to start a wait-for-downlink-end-marker timer when at least one of the DL DRBs is switched to Wi-Fi, and buffer LWIPEP SDUs until decoding a DL end marker or until expiry of the wait-for-downlink-end-marker timer.

Example 14 is the apparatus of Example 13, wherein the RRC connection reconfiguration message indicates a value for the wait-for-downlink-end-marker timer.

Example 15 is the apparatus of Example 13, wherein a value for the wait-for-downlink-end-marker timer and a value for the wait-for-uplink-end-marker timer are pre-defined within a standard.

Example 16 is the apparatus of claim 12, wherein the RRC connection reconfiguration message is for causing the UE to switch one or more UL DRBs of the UE to Wi-Fi and encode an end marker for the switched UL DRBs.

Example 17 is a machine-readable medium storing instructions for execution by processing circuitry of a user equipment (UE) to configure the UE to perform long term evolution (LTE)/wireless local area network (WLAN) radio level Integration Protocol (LWIP) communication, the instructions causing the processing circuitry to: decode a radio resource control (RRC) connection reconfiguration message, received from an evolved NodeB (eNB), the RRC connection reconfiguration message indicting switching data radio bearers (DRBs) from Wi-Fi to long term evolution (LTE), and the RRC connection reconfiguration message including an uplink (UL) LWIP status report indicating a first missing UL LWIP sequence number; reconfigure the UE to switch DRBs according to the RRC connection reconfiguration message; encode, for transmission to the eNB, a RRC connection reconfiguration complete message; and encode, for retransmission over LTE, one or more lost service data units (SDUs) based on the UL LWIP status report.

Example 18 is the machine-readable medium of Example 17, wherein the instructions further cause the processing circuitry to: encode for transmission of LWIP encapsulation protocol (LWIPEP) SDUs of a common DRB over both LTE and Wi-Fi, wherein a LWIPEP trailer comprises less overhead when SDUs are sent over LTE than wen SDUs are sent over Wi-Fi, and wherein a packet data convergence protocol (PDCP) header indicates that LWIPEP SDUs are carried.

Example 19 is the machine-readable medium of Example 18, wherein the PDCP header indicates that LWIPEP SDUs are carried using a reserved bit in the PDCP header.

Example 20 is the machine-readable medium of claim 18, wherein the PDCP header indicates that LWIPEP SDUs are carried by establishing a new DRB.

Example 21 is an apparatus of a user equipment (UE), the apparatus comprising: means for decoding a radio resource control (RRC) connection reconfiguration message, received from an evolved NodeB (eNB), the RRC connection reconfiguration message indicting switching data radio bearers (DRBs) from Wi-Fi to long term evolution (LTE), and the RRC connection reconfiguration message including an uplink (UL) LTE/wireless local area network (WLAN) radio level Integration Protocol (LWIP) status report indicating a first missing UL LWIP sequence number; means for causing reconfiguration of the UE according to the RRC connection reconfiguration message; means for encoding, for transmission to the eNB, a RRC connection reconfiguration complete message; and means for encoding, for retransmission over LTE, one or more lost service data units (SDUs) based on the UL LWIP status report.

Example 22 is a machine-readable medium storing instructions for execution by processing circuitry of a user equipment (UE) to configure the UE to perform long term evolution (LTE)/wireless local area network (WLAN) radio level Integration Protocol (LWIP) communication, the instructions causing the processing circuitry to: decode a radio resource control (RRC) connection reconfiguration message, received from an evolved NodeB (eNB), the RRC connection reconfiguration message indicting transmission of LWIPEP packet data units (PDUs) of a common data radio bearer (DRB) in accordance with both LTE and a WLAN transmission mode; reconfigure the UE to switch DRBs according to the RRC connection reconfiguration message; encode, for transmission to the eNB, a RRC connection reconfiguration complete message; and encode, for transmission of LWIP encapsulation protocol (LWIPEP) PDUs of a common DRB in accordance with both LTE and the WLAN transmission mode.

Example 23 is the machine-readable medium of Example 22, wherein the WLAN transmission mode complies with an Institute of Electrical and Electronic Engineers (IEEE) 802.11 standard.

Example 24 is an apparatus of a user equipment (UE), the apparatus comprising: means for decoding a radio resource control (RRC) connection reconfiguration message, received from an evolved NodeB (eNB), the RRC connection reconfiguration message indicting switching data radio bearers (DRBs) from a wireless local area network (WLAN) transmission mode to long term evolution (LTE), and the RRC connection reconfiguration message including an uplink (UL) LTE/WLAN radio level integration Protocol (LWIP) status report indicating a first missing UL LWIP sequence number; means for causing reconfiguration of the UE according to the RRC connection reconfiguration message; means for encoding, for transmission to the eNB, a RRC connection reconfiguration complete message; and means for encoding, for retransmission in accordance with LTE, one or more lost service data units (SDUs) based on the UL LWIP status report.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The following claims are hereby incorporated into the detailed description, with each claim standing on its own as a separate embodiment.

What is claimed is:

1. A non-transitory computer-readable storage medium storing program instructions executable by at least one processor of a user equipment (UE) to configure the UE to perform long term evolution (LTE) and wireless local area network (WLAN) radio level Integration using IPsec Tunnel (LWIP) communication, the program instructions causing the at least one processor to:
   decode a radio resource control (RRC) connection reconfiguration message, received from a base station, the RRC connection reconfiguration message indicting configuration of LWIP Encapsulation Protocol (EP) packet data units (PDUs) of a data radio bearer (DRB) with aggregation over LTE and LWIP communications;
   reconfigure the UE to switch DRBs according to the RRC connection reconfiguration message;
   encode, for transmission to the base station, an RRC connection reconfiguration complete message; and
   decode, LWIP encapsulation protocol (LWIPEP) PDUs of the DRB with aggregation over LTE and LWIP communications, wherein a header of a respective LWIPEP PDU of the LWIPEP PDUs includes a sequence number that is used for reordering of the PDUs.

2. The non-transitory computer-readable storage medium of claim 1, wherein the communications comply with an Institute of Electrical and Electronic Engineers (IEEE) 802.11 standard.

3. The non-transitory computer-readable storage medium of claim 1, wherein the sequence number is counted on a per DRB basis.

4. The non-transitory computer-readable storage medium of claim 1, wherein the program instructions are further executable to cause the at least one processor to:
encode second LWIPEP PDUs of a second DRB with aggregation over LTE and WLAN-LWIP communications in accordance with both LTE and the WLAN transmission mode,
wherein a header of a respective second LWIPEP PDU of the second LWIPEP PDUs includes a sequence number that is used for reordering of the PDUs of the second DRB.

5. The non-transitory computer-readable storage medium of claim 1, wherein the RRC connection reconfiguration message indicates a LWIP encapsulation protocol (EP) buffering timer for buffering service data units (SDUs) that are sent via a tunnel, the EP buffering timer indicating how long a SDU is held by a transmitter after being sent to the tunnel.

6. The non-transitory computer-readable storage medium of claim 1, wherein a LWIP encapsulation protocol (EP) buffering timer for buffering service data units (SDUs) that are sent via a tunnel is pre-defined, the LWIP EP buffering timer indicating how long a SDU is held by a transmitter after being sent to the tunnel.

7. The non-transitory computer-readable storage medium of claim 1, wherein the at least one processor comprises a baseband processor.

8. The non-transitory computer-readable storage medium of claim 1, wherein the header of the respective LWIPEP PDU is a generic routing encapsulation (GRE) header.

9. An apparatus, comprising:
at least one processor configured to cause a user equipment (UE) to perform long term evolution (LTE) and wireless local area network (WLAN) radio level Integration using IPsec Tunnel (LWIP) communication, wherein the at least one processor is further configured to:
decode a radio resource control (RRC) connection reconfiguration message, received from a base station (BS), the RRC connection reconfiguration message indicting configuration of LWIP encapsulation protocol (LWIPEP) packet data units (PDUs) of a data radio bearer (DRB) with aggregation over LTE and LWIP communications;
reconfigure the UE to switch DRBs according to the RRC connection reconfiguration message;
encode, for transmission to the base station, an RRC connection reconfiguration complete message; and
decode LWIPEP PDUs of the DRB with aggregation over LTE and LWIP communications,
wherein a header of a respective LWIPEP PDU of the LWIPEP PDUs includes a sequence number that is used for reordering of the PDUs.

10. The apparatus of claim 9, wherein the sequence number is counted on a per DRB basis.

11. The apparatus of claim 9, wherein the at least one processor is further configured to cause the UE to:
encode second LWIPEP PDUs of a second DRB with aggregation over LTE and WLAN-LWIP communications in accordance with both LTE and the WLAN transmission mode,
wherein a header of a respective second LWIPEP PDU of the second LWIPEP PDUs includes a sequence number.

12. The apparatus of claim 9, wherein the RRC connection reconfiguration message indicates a LWIP encapsulation protocol (EP) buffering timer for buffering service data units (SDUs) that are sent via a tunnel, the EP buffering timer indicating how long a SDU is held by a transmitter after being sent to the tunnel.

13. The apparatus of claim 9, wherein a LWIP encapsulation protocol (EP) buffering timer for buffering service data units (SDUs) that are sent via a tunnel is pre-defined, the LWIP EP buffering timer indicating how long a SDU is held by a transmitter after being sent to the tunnel.

14. The apparatus of claim 9, wherein the header of the respective LWIPEP PDU is a generic routing encapsulation (GRE) header.

15. A user equipment (UE), comprising:
wireless communication circuitry; and
at least one processor coupled to the wireless communication circuitry configured to cause the UE to perform long term evolution (LTE) and wireless local area network (WLAN) radio level Integration using IPsec Tunnel (LWIP) communication, wherein the at least one processor is further configured to:
decode a radio resource control (RRC) connection reconfiguration message, received from a base station (BS), the RRC connection reconfiguration message indicting configuration of LWIP encapsulation protocol (LWIPEP) packet data units (PDUs) of a data radio bearer (DRB) with aggregation over LTE and LWIP communications;
reconfigure the UE to switch DRBs according to the RRC connection reconfiguration message;
encode, for transmission to the base station, an RRC connection reconfiguration complete message; and
decode LWIPEP PDUs of the DRB with aggregation over LTE and LWIP communications, wherein a header of a respective LWIPEP PDU of the LWIPEP PDUs includes a sequence number that is used for reordering of the PDUs.

16. The UE of claim 15, wherein the sequence number is counted on a per DRB basis.

17. The UE of claim 15, wherein the at least one processor is further configured to cause the UE to:
encode second LWIPEP PDUs of a second DRB with aggregation over LTE and WLAN-LWIP communications in accordance with both LTE and the WLAN transmission mode,
wherein a header of a respective second LWIPEP PDU of the second LWIPEP PDUs includes a sequence number.

18. The UE of claim 15, wherein the RRC connection reconfiguration message indicates a LWIP encapsulation protocol (EP) buffering timer for buffering service data units (SDUs) that are sent via a tunnel, the EP buffering timer indicating how long a SDU is held by a transmitter after being sent to the tunnel.

19. The UE of claim 15, wherein a LWIP encapsulation protocol (EP) buffering timer for buffering service data units (SDUs) that are sent via a tunnel is pre-defined, the LWIP EP buffering timer indicating how long a SDU is held by a transmitter after being sent to the tunnel.

20. The UE of claim 15, wherein the header of the respective LWIPEP PDU is a generic routing encapsulation (GRE) header.

* * * * *